United States Patent [19]
Bouyoucos

[11] Patent Number: 5,646,910
[45] Date of Patent: Jul. 8, 1997

[54] PNEUMATIC GUN FOR RAPID REPETITIVE FIRING

[75] Inventor: John V. Bouyoucos, Pittsford, N.Y.

[73] Assignee: Hyro Acoustics Inc., Rochester, N.Y.

[21] Appl. No.: 571,002

[22] Filed: Dec. 12, 1995

Related U.S. Application Data

[63] Continuation-in-part of Ser. No. 502,704, Jul. 14, 1995.
[51] Int. Cl.$^6$ ........................................... H04R 23/00
[52] U.S. Cl. ........................... 367/144; 181/115; 181/120
[58] Field of Search ............................. 367/144; 181/115, 181/120

[56] References Cited

U.S. PATENT DOCUMENTS

| | | | |
|---|---|---|---|
| 4,108,272 | 8/1978 | Paitson et al. | 181/120 |
| 4,114,723 | 9/1978 | Paitson et al. | 367/144 |
| 4,210,222 | 7/1980 | Chelminski et al. | 181/120 |
| 4,240,518 | 12/1980 | Chelminski | 367/144 |
| 4,246,979 | 1/1981 | Thomson et al. | 367/144 |
| 4,713,800 | 12/1987 | Russell | 367/144 |
| 5,315,917 | 5/1994 | Mayzes | 367/144 |

*Primary Examiner*—J. Woodrow Eldred
*Attorney, Agent, or Firm*—M. Lukacher

[57] ABSTRACT

A pneumatic gun or air gun having a fast-acting sliding valve reciprocable between two axial positions to close or open intake and exhaust ports in a charge chamber in a housing. The sliding valve comprises a piston internal to the housing and may include a piston in a cylinder within and extending beyond the housing. The sliding valve has a sealing flange which forms a lip seal with an annular mating surface of the housing to close an exhaust port. Air accelerating from the gun may be radial from an equatorial exhaust port or may be axial from an end of the charge chamber. The charge chamber is provided with an intake port in selective communication with a source of pressurized gas, thereby to facilitate rapid charging rates. The intake port is closed when the exhaust port is opened by the sliding action of the valve member, and is opened when the lip seal is formed to close the exhaust port. The intake passages to the charge chamber are essentially unrestrictive of the flow of pressurized gas, thereby to facilitate rapid charging rates. The valve is fitted with an annular cocking flange which is disposed in a cocking chamber in the housing and is supplied with pressurized gas on one side to exert a continuous closing force to form and maintain the lip seal. Pressurized gas is provided selectively to the opposite side of the cocking flange to generate an opening force on the valve which is larger than the closing force, thereby breaking the lip seal and permitting gas to discharge suddenly from the charge chamber. In the axial end discharge embodiment, the acoustic output of the gun includes not only the explosive acceleration of gas from the exhaust port, but also the abrupt volume acceleration off the face of the piston.

15 Claims, 7 Drawing Sheets

PNEUMATIC GUN FOR RAPID REPETITIVE FIRING

This is a continuation-in-part of a pending application, Ser. No. 08/502,704, filed Jul. 14, 1995 by J. V. Bouyoucos.

The present invention relates to high-pressure, pneumatic guns used for acoustic echo ranging, particularly to such guns used for seismic surveying in water or for echo ranging off underwater objects, and most particularly to guns providing a very sharp onset to an acoustic wave.

Shock waves for acoustic echo ranging underwater typically are produced by explosives, spark discharges, or the abrupt release of a compressed gas volume. Guns powered by compressed air for this purpose are known in the art.

An important performance criterion for an acoustic gun is the abruptness with which its charge can be released, as this influences directly the intensity, or amplitude, of the acoustic wave being produced and, hence, the efficiency of the gun. The maximum acoustic pressure pulse occurs when the gas discharge acceleration rate is maximum. Thus, it is desirable that the exhaust port be very large, that is, not significantly limiting to flow, and that the port move from tightly closed (restraining air at, typically, about 2000 psi) to fully open in the shortest possible time. Ideally, the exhaust porting of a gun is non-limiting, and the bubble of compressed air is free to expand at a maximum rate governed only by the laws of hydrodynamics. All known guns are non-ideal to varying degrees. Since a finite time is required to open a discharge orifice, and since the compressed gas will expand faster than any known port can be opened, it is important that the discharge area open rapidly enough to maintain the desired gas flow while the bubble is escaping the gun.

Although such pneumatic guns can be operated with any compressible gas, the preponderance of use is with compressed air. Accordingly, hereinafter the word air will be used exclusively, with its being understood that air represents generically the broader term, gas.

In certain acoustic echo ranging applications, it is desirable to fire an apparatus repeatedly at short intervals to create a pulse train. This requires that a gun be capable of rapid recharging. Discharge frequencies from the fractional or low Hz rate to 20 Hz may be needed for these applications. Some previous proposed configurations for acoustic guns capable of repeated firings separated by short intervals are contained in U.S. Pat. Nos. 4,108,272; 4,114,723; 4,246,979 and 4,713,800.

Early guns typically have high-pressure supply shut-offs isolated from the charge chamber by small-bore passages, sometimes in the slide valve itself, which limit the fill rate of the charge chamber. The substantial throttling in such a pneumatic supply results in relatively slow cycling of the gun between discharges. Attempts to increase the firing rate by increasing the size of the supply passages can result in stalling of the gun mechanism. Fill-rate limited guns are disclosed in U.S. Pat. Nos. 4,210,222 to P. Chelminski et al., and 4,240,518 to S. Chelminski. Further, in these and other prior air guns, high-pressure air continues to flow to the charge chamber during discharge of the gun, which does not contribute to the intensity of the pulse, is wasteful of energy, and potentially can stall the gun from repetitive firing by preventing the timely closure of the lip seal.

The inefficiency of certain known guns is compounded by a need for large, relatively massive sleeve valves to accommodate the particular activation mechanisms used for these guns. The heavier the valve the greater is the fraction of the stored energy of compressed gas needed to obtain a desirable port opening velocity, and the lower is the maximum pressure amplitude pulse obtainable for the given initial stored energy.

It is a principal object of the invention to provide an improved acoustic gun having a light-weight valve, a large discharge port, and a short valve stroke, which gun can create a sharp intense acoustic pulse with high energy efficiency.

It is a further object of the invention to provide an improved acoustic gun wherein the flow of high-pressure air into the charge chamber occurs when the exhaust port is closed, and wherein the flow of high-pressure air into the charge chamber is shut off when the exhaust port is open.

It is a still further object of the invention to provide an improved acoustic gun wherein the flow of pressurized air through the intake port to the charge chamber is not substantially throttled by small-bore restrictions in the flow path.

It is a still further object of the invention to provide an improved acoustic gun capable of firing at peak pressure multiples of times per second to provide a string of acoustic pulses.

It is a still further object of the invention to provide an improved acoustic gun requiring a single air pressure supply for both actuation and impulse generation.

It is a still further object of the invention to provide an improved acoustic gun wherein the flow of compressed air into and out of a charge chamber is regulated by a single sliding valve member.

It is a still further object of the invention to provide an improved acoustic gun which can be used in an array of such guns to be fired in synchronization to provide a train of broadband, high power, directive acoustic impulses for echo ranging purposes.

Briefly described, an air gun embodying the invention comprises a housing connectable to a source of pressurized air, the housing having a charge chamber therein and also a sliding valve member which closes or opens intake and exhaust ports connected to the charge chamber. At a first extreme position of the sliding member, a first flange on the sliding member mates with a flange area on the housing to form a lip seal to close the exhaust port, and an intake port to the charge chamber is opened to the high-pressure air source. The passage for air from the intake port to the charge chamber may include an axial bore through the sliding member. One face of a second flange on the sliding member is continuously exposed to high-pressure air in a cocking chamber in the housing, thereby biasing the sliding valve member to exert a closing force $F_c$ on the lip seal at the discharge port. The opposite face of the second flange is provided selectively with high-pressure air through a solenoid valve. To fire the gun, the solenoid valve is activated and the opposite face becomes pressurized to provide an opening force $F_o$ greater than and opposed to the closing force, whereby the sliding valve member is urged toward a second and opposite extreme position, thus opening the lip seal. The pressure of the compressed air in the charge chamber augments the opening force provided by the opening of the solenoid valve and accelerates movement of the valve member. The compressed air in the charge chamber discharges explosively from the exhaust port, creating the desired acoustic pulse. The sliding valve member in moving to its second extreme position closes the intake port to the high-pressure air source, thereby sealing off the charge chamber from the high-pressure source as the chamber exhausts. Since high-pressure air is supplied to the cocking chamber at all times, when the discharge pressure in the charge chamber drops sufficiently and the solenoid is deactivated to shut off pressurized air to the opposite face of the second flange, the closing force $F_c$ still present in the cocking chamber drives the sliding member back to the first extreme wherein the lip seal is reformed, the intake port to the charge chamber is reopened without restriction to the high-pressure source, and the gun rapidly recharges for another firing cycle.

The foregoing and other objects, features, and advantages of the invention, as well as presently preferred embodiments thereof, will become more apparent from a reading of the following description in connection with the accompanying drawings in which.

Figure 1:
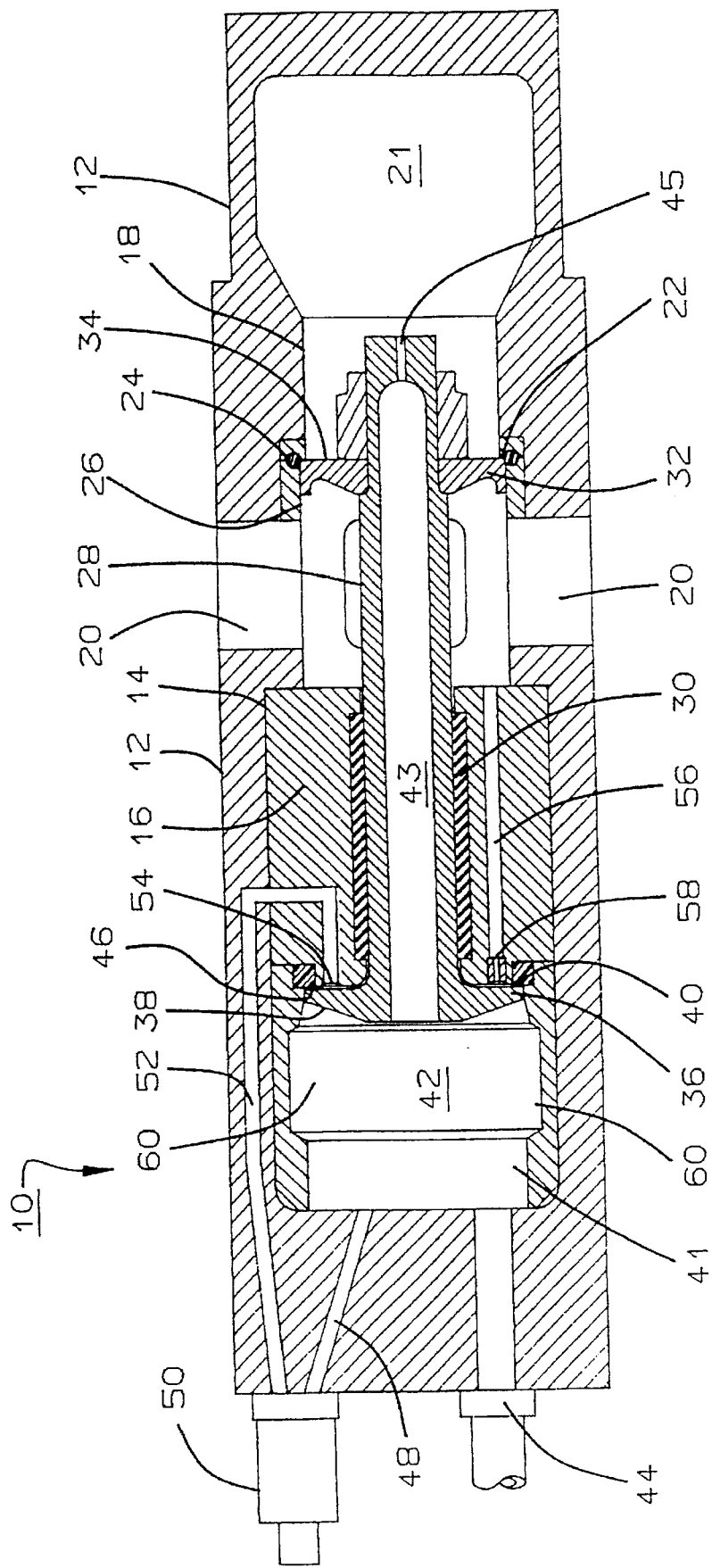
FIG. 1 is a longitudinal cross-sectional view of a fill-rate limited prior art acoustic gun.

Referring to FIG. 1, there is shown a cross-sectional view of a fill-rate limited prior art acoustic gun 10. A housing 12 has a first bore 14, containing an insert 16, an equatorial exhaust port 20, and a second bore 18 which terminates in a charge chamber 21. Second bore 18 is relieved to provide a first annular sealing face 22 perpendicular to the longitudinal axis of the gun, which seal may include a resilient member such as O-ring 24 and may comprise a replaceable seal insert 26. A valve member 28 is slidably disposed in a resilient bearing member 30 within insert 16 and extends into second bore 18. In FIG. 1, valve member 28 is shown in a first extreme position. Valve 28 is provided near a first end with a first flange 32 having a second annular sealing face 34 which is adapted to mate with first face 22 to form a lip seal to close charge chamber 21 from exhaust port 20.

Valve member 28 is provided at the opposite end with a second flange 36 having third and fourth faces 38 and 40, respectively, on opposite sides of flange 36. Second flange 36 is selectively larger in diameter than first flange 32. Insert 16 is provided with an intake chamber 42 which is supplied with high-pressure air through connector 44 from a source (not shown). When valve 28 is in the first extreme position, fourth face 40 is sealed against sealing surface 46 and is not exposed to intake chamber 42, whereas third face 38 is fully exposed to the high-pressure air in chamber 42.

Valve member 28 is further provided with a first axial bore 43 in direct communication with intake chamber 42 and in metered communication with charge chamber 21 via a metering bore 45.

Pressurized air from chamber 42 is supplied via first passage 48 to a solenoid flow switch 50, preferably an electric solenoid valve, which can selectively provide pressurized air via second passage 52 to an annular groove 54 adjacent to fourth face 40.

Housing 12 is further provided with a pressure-relief passage 56 and restriction 58 by which pressure in groove 54 can be bled into exhaust port 20.

In operation, pressurized air is continually admitted to intake chamber 42 through connector 44 and flows through bores 43 and 45 at a flow rate limited by the restriction of bore 45 to fill charge chamber 21 to or near pressure equilibrium with the high-pressure source. Pressurized air also flows via passage 48 to solenoid 50 which is initially closed. Air in chamber 42 exerts a force $F_c$ on third face 38 which urges valve 28 to the first extreme position shown in FIG. 1. Thus chamber 42 functions both as an intake chamber for supply of air to the charge chamber and as a cocking chamber for exerting closing force on the lip seal. With both chambers 42 and 21 charged to the same pressure, the larger diameter (area) of second flange 36 relative to first flange 32 biases the valve member 28 to its closed position. The gun is now ready for firing. When solenoid 50 is momentarily activated, pressurized air is applied through passage 52 and groove 54 to fourth face 40 of second flange 36, exerting an opening force thereupon and counter to closing force $F_c$. Restriction 58 is small enough that substantially full line pressure is brought to bear on fourth face 40. The combined opening force $F_o$ on the face of first flange 32 and on fourth face 40 is greater than the closing force on third face 38 ($F_o > F_c$), which causes valve 28 to begin to slide axially, breaking the lip seal and permitting the violent discharge of air from charge chamber 21.

As valve 28 begins to move toward its second extreme position, the solenoid valve 50 is deactivated, second flange 36 encounters a bypass region 60 of chamber 42 wherein air can flow freely around flange 36 and the flange can therefore move axially without substantial opposition. At the second extreme position, flange 36 moves into a full-fitting region 41 of chamber 42 and thus experiences a decelerating force on its third face 38. With the valve 28 in its extreme open position, chamber 21 is partially exhausted of its compressed air charge and the net closing force now exceeds the opening force. The valve 28 begins to move toward its closed position.

Simultaneously with the first flange 32 of valve 28 reseating against lip seal 22 to close off the charge chamber 21, fourth face 40 of flange 36 engages seal 46. The orifice 58 and opening 56 allow the relieved region between fourth face 40 and its mating surface to become equalized to the low, external ambient pressure. The pressure in chamber 42, 43, base 45 and chamber 21 become equalized to supply pressure. With the area of second flange 36 (including the area of base 43) being larger than the area of first flange 32, the valve again is locked in its closed position.

Through the entire cycle, high-pressure air is supplied continuously to the charge chamber, requiring a fundamental balance to be struck in the sizing of gun components. For rapid repetitive firing of the gun, the metering bore 45 should be as large as possible to refill the charge chamber as rapidly as possible. However, air flowing into the charge chamber while the lip seal is still open can cause the chamber to become partially pressurized before the lip seal reforms, and the valve may stall at mid stroke, rendering the gun inoperable. Thus bore 45 must be sufficiently restrictive that the charge chamber can be closed at each return stroke of the valve. This restriction can limit the repetition rate of the gun to less than 1 Hz, whereas many echo ranging applications may require repetitions in the range between 1 and 20 Hz.

The limitation of bore 45 would be overcome if the high-pressure air flowing to the charge chamber were passed through an intake port which could be shut off at all times except when the lip seal is closed. This would permit the elimination of a performance restriction on the maximum size of bore 45 enabling it to be freely open to the charge chamber, permitting thereby the very rapid admission of the required amount of pressurized air to the charge chamber in a very short time after opening of the intake port. Guns of the subject invention embody this improvement.

Figure 2:
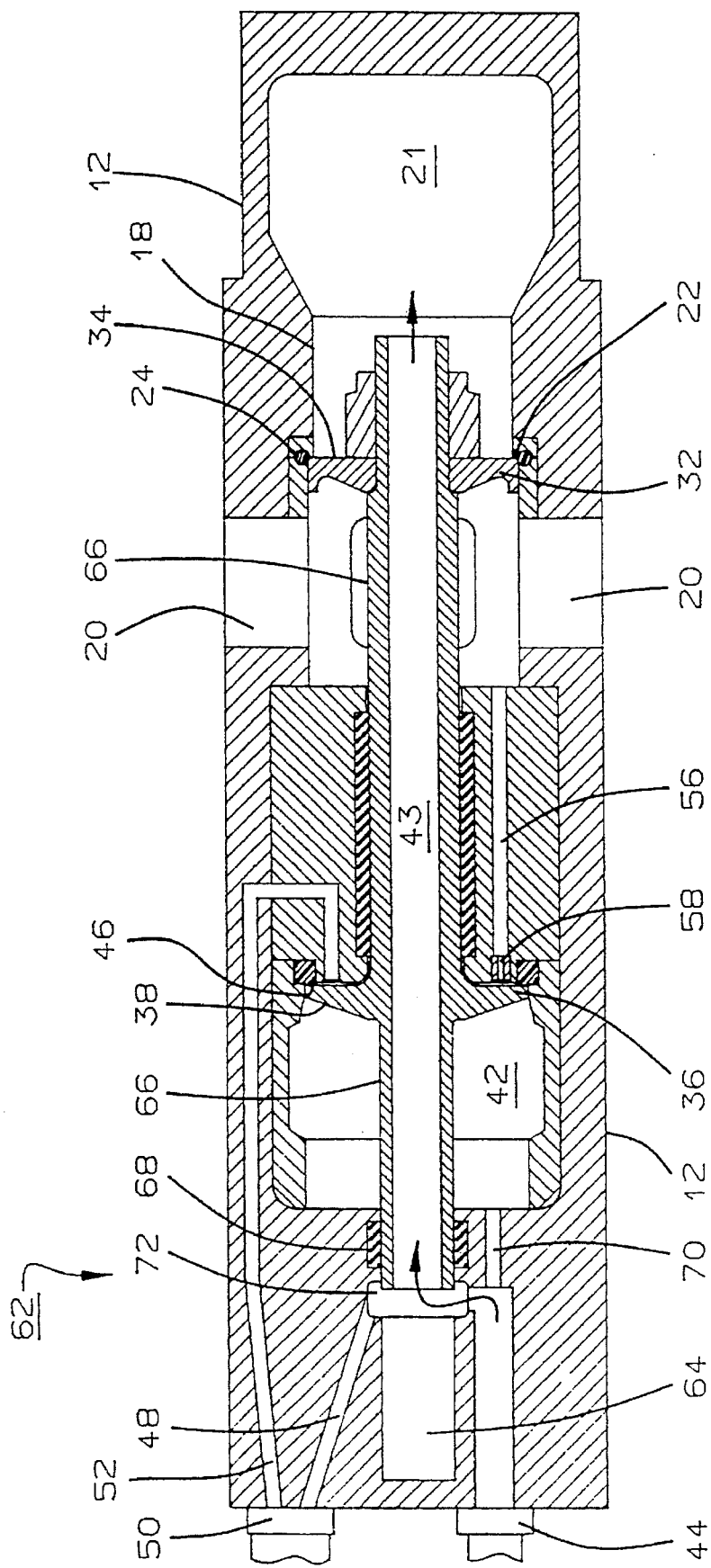
FIG. 2 is a longitudinal cross-sectional view of an acoustic gun in accordance with the invention, showing the valve member in a first extreme position wherein the intake port to the charge chamber is open and the exhaust port is closed prior to firing.

In FIG. 2 is shown a cross-sectional view of a gun 62 in accordance with the invention. The charge chamber, lip sealing, pressure balance on a second flange, and firing mechanism can be substantially as disclosed in prior art gun 10. Improvement occurs in the intake components supplying air to the charge chamber. Bore 45 is eliminated, permitting full flow of air to the charge chamber. The housing 12 extends axially and is provided with bore 64 in which a longer valve member 66 is disposed to slide through resilient bearing member 68. Pressurized air is still supplied directly to third face 38 to generate $F_c$ in a cocking chamber 42, via passage 70, but the charging air is diverted to an annular intake manifold 72 in bore extension 64.

When sleeve valve 66 is in the first position, as shown in FIG. 2, the charge chamber is sealed conventionally from the exhaust port by the mating of faces 22 and 34, and the intake manifold is open to bore 43 to permit rapid filling of the charge chamber.

Figure 3:
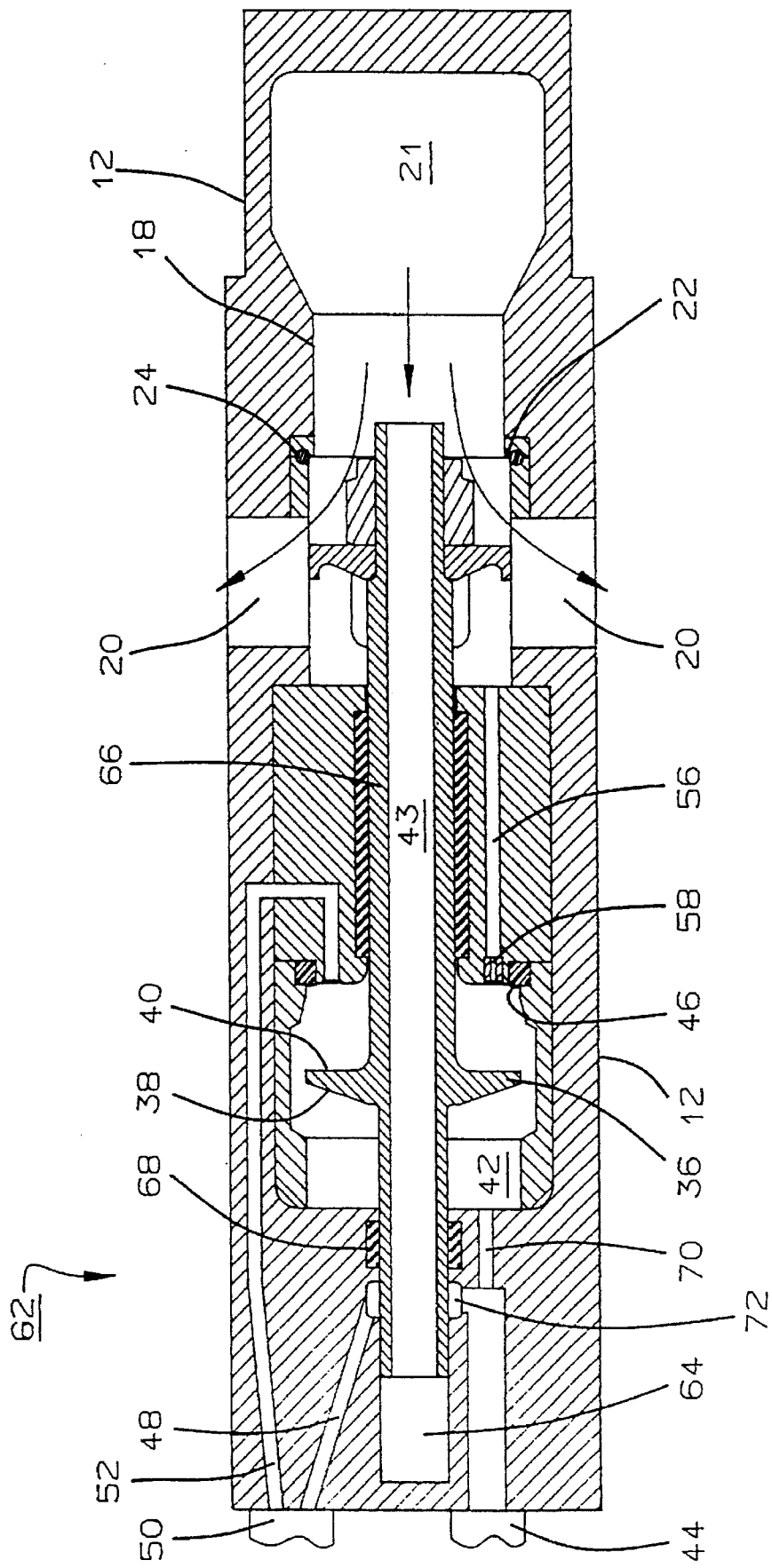
FIG. 3 is a longitudinal cross-sectional view of the gun of FIG. 2, showing the valve member in an intermediate position wherein the intake port to the charge chamber is closed and the exhaust port is partially open during firing.
Figure 4:
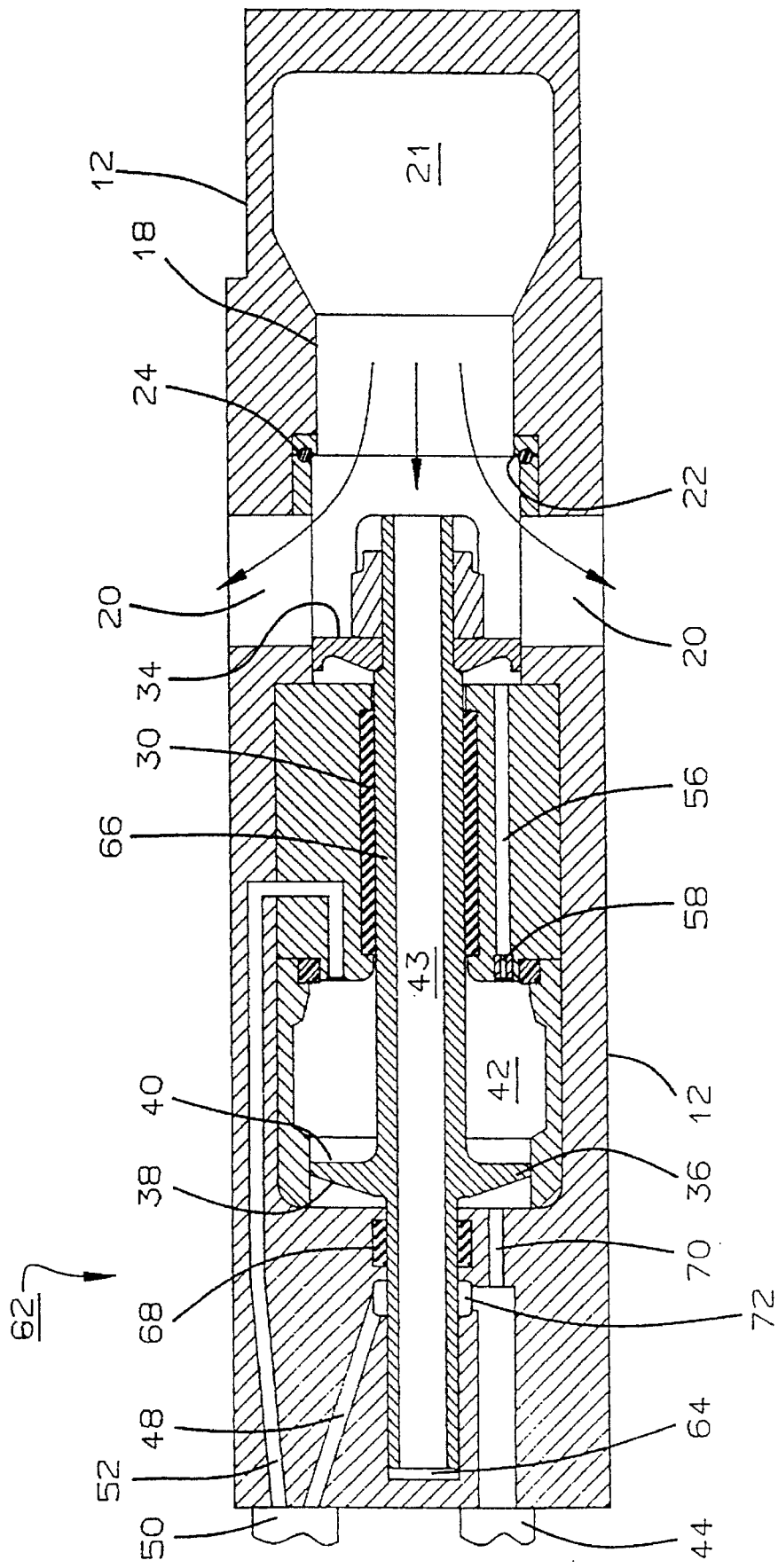
FIG. 4 is a longitudinal cross-sectional view of the gun of FIG. 2, showing the valve member in a second extreme position wherein the intake port to the charge chamber is closed and the exhaust port is fully open after firing.

When solenoid 50 is activated and the sleeve valve begins to move, not only is the exhaust port opened by the sliding action of the valve, the intake manifold (or port) is immediately closed, as shown in FIGS. 3 and 4, and remains closed through the rest of the cycle until first flange 32 has re-entered second bore 18 and the charge chamber seal is reformed. Thus very rapid cycling of the gun can occur without risk of stalling in mid-cycle from premature re-filling of the charge chamber.

Figure 5:
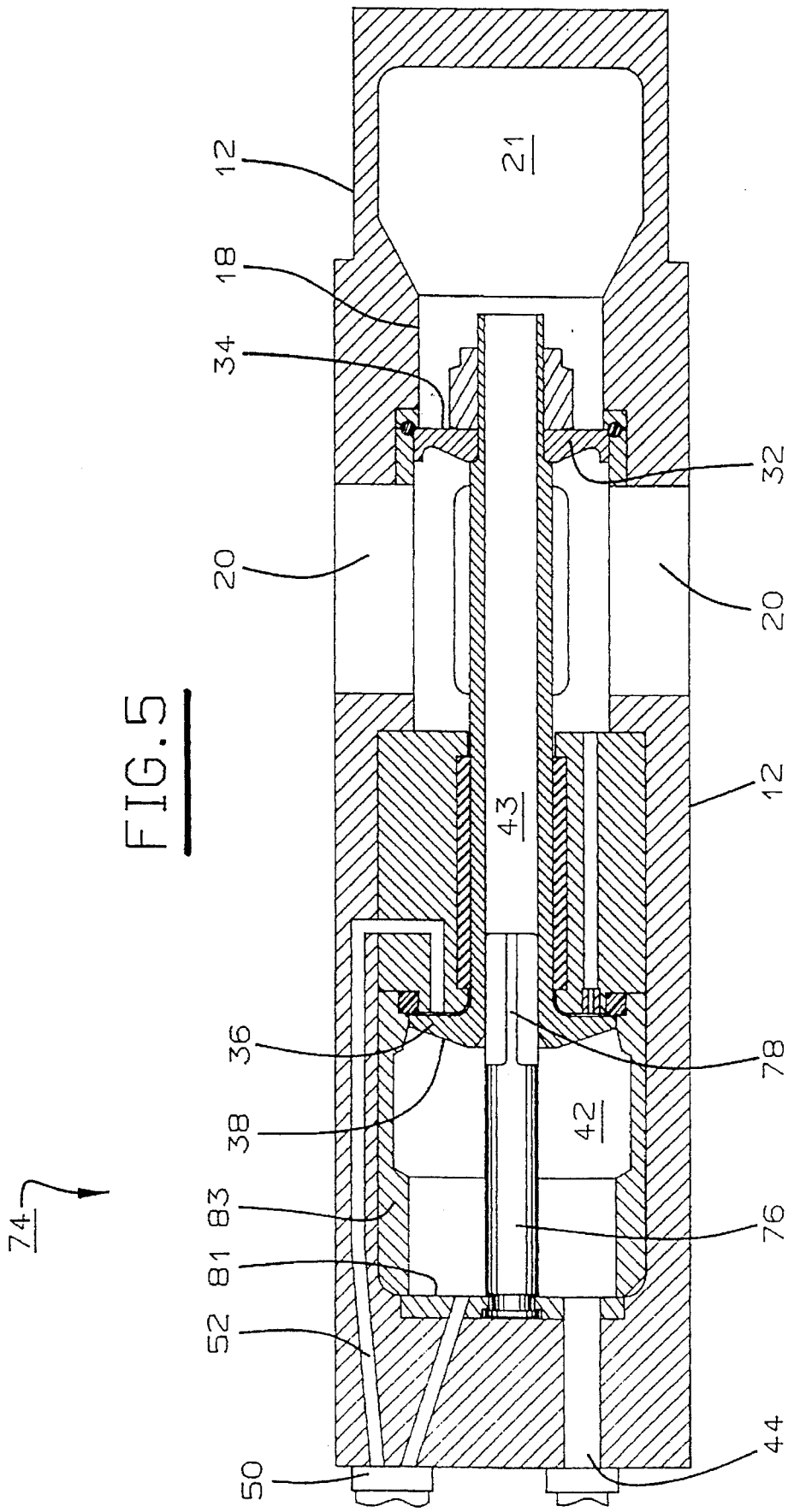
FIG. 5 is a longitudinal cross-sectional view of a second embodiment of an acoustic gun in accordance with the invention, showing the valve member in the first position.
Figure 6:
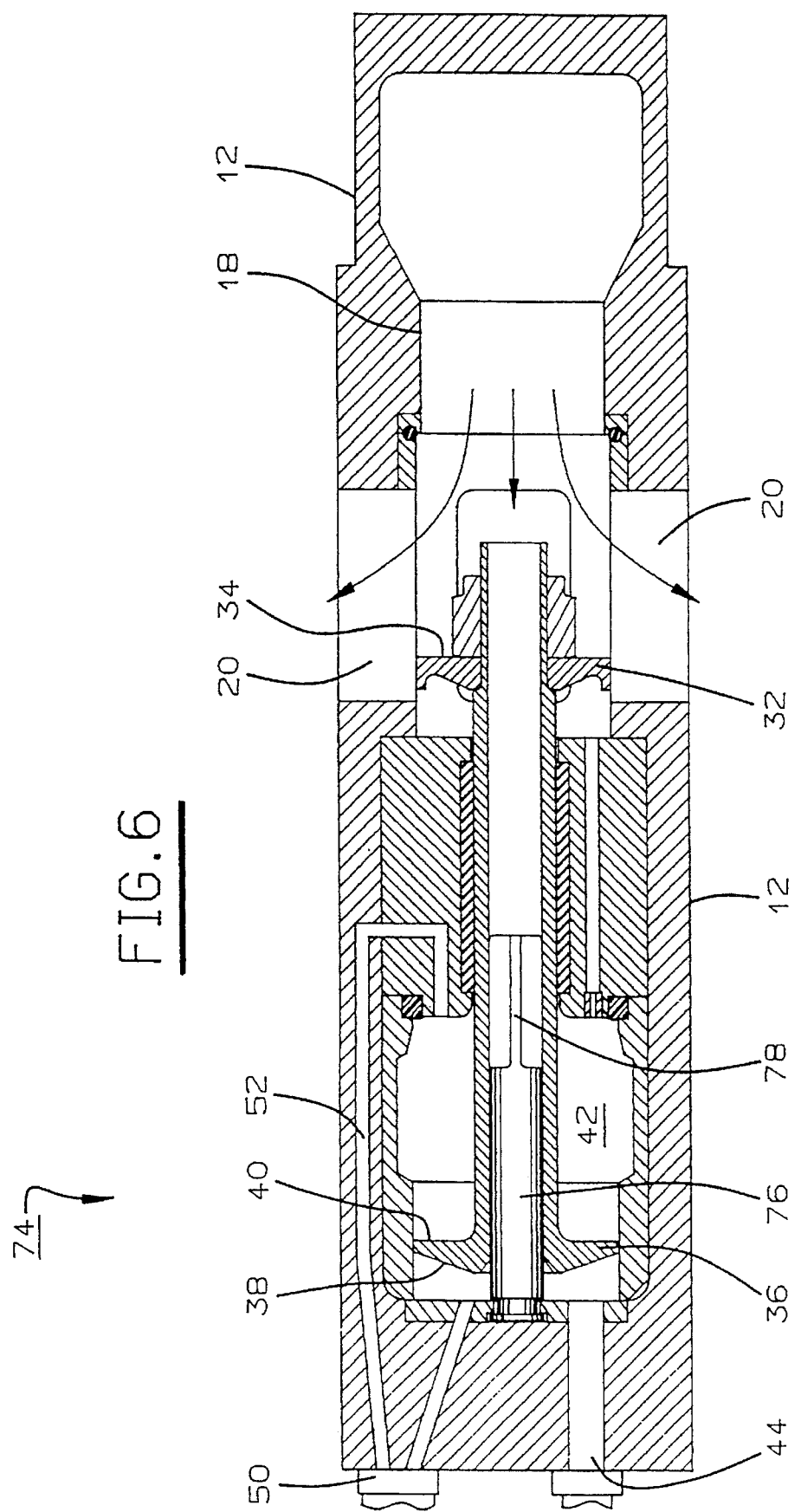
FIG. 6 is a longitudinal cross-sectional view of the gun of FIG. 5, showing the valve member in the second position.

A second embodiment 74 of an acoustic gun in accordance with the invention is shown in FIGS. 5 and 6, which are analogous to FIGS. 2 and 4. Embodiment 74 shows how prior art gun 10 might be retrofitted to enjoy the benefits of the subject invention. Intake chamber 42 is fitted with a spindle 76 which is captured and centered by retaining plate 81 which, in turn, is held in place by annular spacer 83. Spindle 76 has flutes 78 over a portion of its length and extends into bore 43. The fluted portion functions as an intake port to bore 43 and is covered when the sleeve valve begins to move upon firing, to shut off the supply of high-pressure air to the charge chamber. Also, the end of bore 43 connecting to the charge chamber 21, previously containing the restriction 45, can be partially or wholly reamed out to open the passageway for the free flow of pressurized air to the charge chamber.

Figure 7:
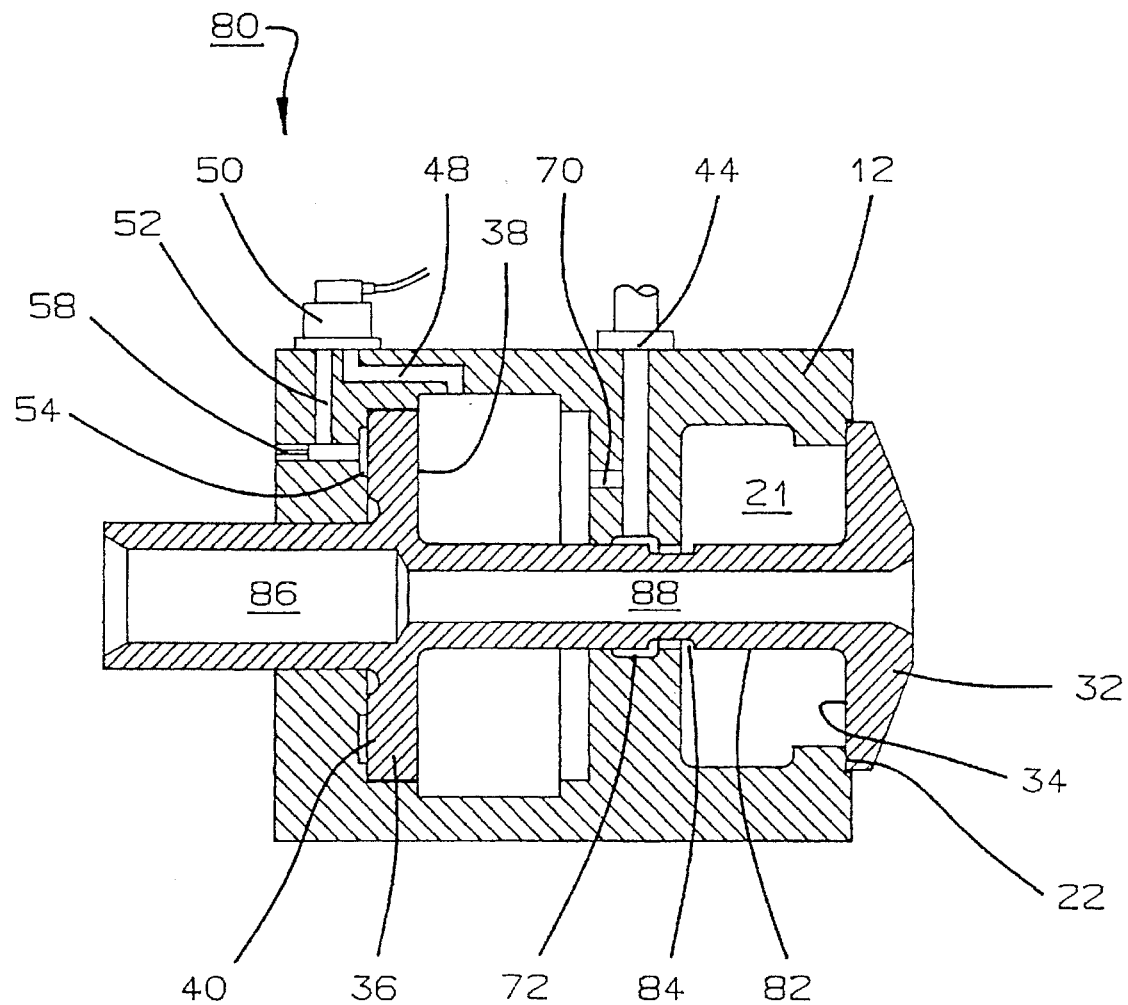
FIG. 7 is a longitudinal cross-sectional view of a third embodiment of an acoustic gun in accordance with the invention wherein the sliding valve member is a piston, and discharge of air from the gun is axial, the gun thereby being end firing.

Another embodiment 80 of an acoustic gun in accordance with the invention is shown in FIG. 7. The valve in this embodiment is a piston 82. The components analogous to those shown in FIGS. 1 through 6 are so numbered in the drawing, and the operation is identical with that of embodiments 62 and 74. Compressed air is supplied to the charge chamber 21 via an annular groove 84 in the piston which is matable with intake manifold 72 only when the piston is in the first position, the supply of air to the charge chamber being shut off when the piston is displaced from its first position upon firing of the gun. In this embodiment, the slidable member is not required to be hollow, as in guns 62 and 74. However, boring the piston to provide chambers 86 and 88, as shown in FIG. 7, substantially reduces the mass and inertia of the piston and thereby improves the speed of opening of the gun and the sharpness of onset of the acoustic pulse being generated.

From the foregoing description it will be apparent that there has been provided an improved acoustic gun, wherein a single sliding valve member acts to control the opening and closing of both the intake port and the exhaust port, and wherein the supply of high-pressure air to the charge chamber is shut off while the gun is firing. Variations and modifications of the herein described acoustic gun, in accordance with the invention, will undoubtedly suggest themselves to those skilled in this art. Accordingly, the foregoing description should be taken as illustrative and not in a limiting sense.

What is claimed is:

1. An air gun for creating acoustic pulses by sudden release of pressurized gas, comprising:

a) a housing containing a charge chamber for storing an amount of said pressurized gas and being connectable to a source of pressurized gas, said housing having an intake port and an exhaust port communicable with said charge chamber for flow of said gas, said housing having an axial bore, said housing having a first matable face adjacent to said exhaust port;

b) a first valve within said housing having i) an axis coaxial with said axial bore along which said valve is slidably reciprocable within said housing to either of two alternate positions, said valve being guided solely by said axial bore, ii) a first flange having a second face disposed in a first plane perpendicular to said axis, being matable with said first face in said first valve position to form a lip seal for closing said exhaust port, and being removable in said second valve position from said first face to open said exhaust port, iii) a second flange having a third face disposed in a second plane perpendicular to said axis to which face pressurized gas is applied to urge said first valve toward said first mating face with a closing force $F_c$, and a fourth face disposed in a third plane perpendicular to said axis and opposing said third face, and iv) a hollow member containing said axis and open at both ends for passage of pressurized gas from a source into said charge chamber, said hollow member supporting said first and second flanges in spaced-apart relationship and being axially slidable therewith;

c) a second valve selectively providing pressurized gas via a passageway in said housing to at least one of said first, second, and fourth faces to create thereupon an opening force $F_o$ greater than said closing force $F_c$ on said third face to cause said first valve to move from said first position to close said intake port and to break said lip seal and permit explosive discharge of said amount of pressurized gas from said charge chamber through said exhaust port.

2. The air gun in accordance with claim 1 wherein said slidable valve member blocks said exhaust port and exposes said intake port when in said first position, and exposes said exhaust port and blocks said intake port when in said second position.

3. The air gun in accordance with claim 1 wherein said second valve comprises a solenoid.

4. The air gun in accordance with claim 1 wherein said gun contains a cocking chamber in which said third face of said slidable valve is exposed to said pressurized gas, said cocking chamber being in continuous communication with said gas source.

5. The air gun in accordance with claim 1 wherein said gas is air.

6. The air gun in accordance with claim 1 wherein said gas pressure is greater than 1000 pounds per square inch.

7. The air gun in accordance with claim 1 wherein said first valve comprises a member having an axial bore, axially reciprocable within said housing.

8. The air gun in accordance with claim 1 wherein said first valve member comprises a piston.

9. An air gun for use with a source of pressurized gas and operative to generate acoustic pulses in an underwater environment, said gun comprising:
   a) a housing having a first axial bore, a portion of which bore is a charge chamber, said chamber having an exhaust port, and said bore having an annular flange forming a portion of said exhaust port;
   b) a valve disposed within said first axial bore reciprocally movable between first and second positions and being guided solely by contact at its periphery with said housing bore, said valve having a second axial bore therethrough for the conduction of pressurized gas to said charge chamber;
   c) a sealing flange on said valve forming a lip seal against said annular housing flange to close said charge chamber to the atmosphere surrounding said housing when said valve is in said first position;
   d) an intake port in said housing in communication with said source of pressurized gas and cooperating with said valve admitting an amount of pressurized gas from said source to said charge chamber through said second axial bore when said valve is in said first position;
   e) first means for biasing said sleeve valve to said first position by a closing force $F_c$; and
   f) second means for selectively biasing said sleeve valve toward said second position by an opening force $F_o$ to block said intake port and to expose said exhaust port permitting discharge of said pressurized gas from said charge chamber to the surrounding atmosphere to create an acoustic pulse when said sleeve valve is away from said first position.

10. The air gun in accordance with claim 9 wherein de-selection of said second means automatically causes said piston to be biased again to said first position by said first means.

11. An air gun for use with a source of pressurized gas and operative to generate acoustic pulses in an underwater environment, said gun comprising:
   a) a housing having a bore defining an opening in a wall of said housing;
   b) a piston disposed within and beyond said bore and reciprocally movable between first and second axial positions, said piston defining along with said bore a charge chamber in selective communication with said opening;
   c) a first flange on said piston having a second face forming a lip seal against an annular portion of said housing wall defining a first face, said first and second faces being matable to form a lip seal to close chamber to the atmosphere surrounding said housing when said piston is in said first position, and defining an exhaust port when said piston is in said second position;
   d) conduit and porting means in cooperative relationship on said housing and piston admitting an amount of pressurized gas from a source to said charge chamber when said piston is in said first position and sealing said charge chamber against admission of pressurized gas;
   e) a second flange on said piston having a third face continuously receiving pressurized gas to bias said piston toward said first position by a closing force $F_c$, and having a fourth face opposite said third face selectively receiving pressurized gas to selectively bias said piston toward said second position by an opening force $F_o$ to overcome $F_c$ to open said charge chamber to the exterior of said housing, permitting explosive escape of said pressurized gas from said chamber to the surrounding atmosphere to create an acoustic pulse.

12. The air gun in accordance with claim 11 wherein said conduit and porting means for admitting pressurized gas to said charge chamber comprises a manifold defined by said axial bore, said manifold being in communication with said source and in selective communication with said charge chamber in said piston.

13. The air gun in accordance with claim 11 further comprising a solenoid valve selectably directing pressurized gas to said fourth face and selectively biasing said piston toward said second position.

14. A gas gun in accordance with claim 13 wherein de-activation of said solenoid valve automatically causes said piston to be biased again toward said first position.

15. A method for providing a train of acoustic pulses, comprising the steps of:
   a) providing an acoustic gun having
      i) a housing containing a charge chamber for storing an amount of pressurized gas and being connectable to a source of pressurized gas, said housing having an inlet port and an exhaust port in communication with said charge chamber for flow of said gas, said housing having an axial bore therein including a first matable face adjacent to said exhaust port;
      ii) a first valve axially slidable within said axial bore in said housing and being guided solely by said axial bore, said first valve having
         A) an axis coaxial with said axial bore along which said valve is slidably reciprocable within said housing to either of two alternate positions,
         B) a first flange having a second face and disposed in a first plane perpendicular to said axis, said second face being matable with said first face to form a lip seal for closing said exhaust port, and being removable from said first face to open said exhaust port,
         C) a second flange having a third face disposed in a second plane perpendicular to said axis to which face pressurized gas is applied to urge said first valve toward said first mating face with a closing force $F_c$, and a fourth face disposed in a third plane perpendicular to said axis and opposing said third face, and
         D) a hollow member containing said axis and open at both ends for passage of pressurized gas from a source into said charge chamber, said hollow member supporting said first and second flanges in spaced-apart relationship and being axially slidable therewith;
      iii) a second valve for selectively providing pressurized gas via a passageway in said housing to at least one of said first, second, and fourth faces to create thereupon an opening force $F_o$ greater than said closing force $F_c$ on said third face;
   b) admitting pressurized gas to said third face in said cocking chamber to urge said first valve to a first extreme position to close said exhaust port and to open said intake port;

c) admitting an amount of pressurized gas through said intake port to charge said charge chamber;

d) admitting pressurized gas against said fourth face to displace said first valve toward a second extreme position wherein said intake port is closed and said exhaust port is open, permitting the sudden discharge of compressed gas from said charge chamber and creating thereby an acoustic pulse; and e) repeating steps b) through d) any number of times as desired to create said train of acoustic pulses.

* * * * *